(12) United States Patent
Fischäss

(10) Patent No.: US 6,997,102 B2
(45) Date of Patent: Feb. 14, 2006

(54) PNEUMATIC CYLINDER WITH SAFETY DEVICE

(75) Inventor: Gerhard Fischäss, Heiningen (DE)

(73) Assignee: Schuler Pressen GmbH & Co. KG, Göppingen (DE)

( * ) Notice: Subject to any disclaimer, the term of this patent is extended or adjusted under 35 U.S.C. 154(b) by 50 days.

(21) Appl. No.: 10/843,579

(22) Filed: May 12, 2004

(65) Prior Publication Data
US 2004/0244578 A1   Dec. 9, 2004

(30) Foreign Application Priority Data
Jun. 5, 2003   (DE) ................................. 103 25 357

(51) Int. Cl.
*F16J 10/00*   (2006.01)

(52) U.S. Cl. ................... 92/169.1; 92/85 R; 72/453.18

(58) Field of Classification Search ................ 92/85 R, 92/169.1, 169.2, 171.1; 72/453.18; 100/254, 100/265, 346, 347
See application file for complete search history.

(56) References Cited

U.S. PATENT DOCUMENTS 5,300,184 A * 4/1994 Masunaga ................... 100/160

FOREIGN PATENT DOCUMENTS

| DE | 24 16 102 C3 |   | 10/1975 |
| DE | 2819133 A | * | 10/1979 |
| DE | 2200866 A | * | 8/1988 |
| JP | 62168700 A | * | 7/1987 |

* cited by examiner

*Primary Examiner*—Thomas E. Lazo
(74) *Attorney, Agent, or Firm*—Fitch, Even, Tabin, & Flannery; Norman N. Kunitz; George H. Spencer

(57) ABSTRACT

A pneumatic force-generating device, for example, a pneumatic cylinder for balancing the ram weight on a press, is provided with an impact or catching device having an impact plate (24) for catching the piston (18) upon discharge of the weight. The deformable impact plate (24) is securely clamped along its edge or held by a clamping device (31), that permits a controlled slipping through. The impacting piston (18) deforms the impact plate (24) to absorb the kinetic energy produced if this piston is released as a result of damage and is accelerated by the existing gas bolster and thrown against the impact plate (24).

24 Claims, 7 Drawing Sheets

PNEUMATIC CYLINDER WITH SAFETY DEVICE

CROSS REFERENCE TO RELATED APPLICATION

This application claims the benefit of and incorporates herein by reference, in its entirety, German patent application number DE 103 25 357.2 filed Jun. 5, 2003.

FIELD OF THE INVENTION

The invention relates to a pneumatic force-generating device of the type that can be used in particular as a ram-weight balancing device on a press, especially a large-scale press, but can also be used for other purposes.

BACKGROUND OF THE INVENTION

Large-scale presses, especially bulky part multiple-die presses, are provided with rams, which are moved vertically up and down by a main drive for the press. Eccentric drives are used, for example, for lifting and lowering the rams. To even out the movement and remove a load from the drive, pneumatic cylinders containing vertically displaceable pistons are frequently installed above the ram, wherein a piston rod that is subjected to a pull is connected to the ram. The pneumatic cylinders generate a pull in an upward direction, which partially or totally compensates or counter balances the force of the ram weight.

To compensate for the considerable weight of a ram, the pneumatic cylinders must have a considerable size. They consequently hold a corresponding compressed air volume that can exceed one cubic meter. Since the energy stored therein is considerable, care must be taken to ensure that this energy does not become dangerous. For example, if the piston rod of the pneumatic cylinder breaks off as a result of material fatigue or another type of material defect, the force of the gas bolster or cushion enclosed inside the pneumatic cylinder acts upon the piston and accelerates it. Given an unfavorable arrangement, the piston can then shoot out of the pneumatic cylinder in the manner of a projectile.

Starting with this premise, it is the object of the present invention to provide a pneumatic force-generating device for keeping the resulting danger in check, even during the sudden removal of a counter force for the connected device.

SUMMARY OF THE INVENTION

The above object generally is solved by an improved pneumatic force-generating device according to the invention.

The force-generating device according to the invention comprises a cylinder with a piston that is disposed displaceable therein, is sealed against the cylinder wall and is connected to a piston rod or a different type of force-transmitting device, for example, a pipe or the like. A gas bolster or cushion that acts upon the piston is enclosed inside the cylinder adjacent one end of the piston. A piston-catching device provided with a deformable impact plate is arranged at the cylinder end toward which the gas bolster pushes the piston. The impact plate forms an elastically deformable barrier for the piston, and is deformed upon impact by the piston and is primarily stretched in the process. The plate is dimensioned such that the deformation energy it absorbs is sufficient to completely dissipate the kinetic energy of the piston, so that the piston is stopped following the deformation of the impact plate. The deformation is preferably a combination bending-stretching process, similar to the deep drawing of sheet-metal objects. The drawing distance of the impact plate in this case corresponds to the braking distance of the piston.

Particularly dangerous are piston-rod breakages at the lower dead center point of the ram where the piston is at the greatest distance from the impact plate. The available cylinder stroke distance then becomes the acceleration distance of the piston. Thus, once the piston has completed the stroke distance, it has considerable kinetic energy. The impact plate is dimensioned so as to absorb this energy and to permit a safe catching of the piston, even if force-transmitting parts break off near the lower piston dead center, thus increasing the safety. The danger to personnel nearby or to other plant components can be minimized and/or eliminated.

The impact plate in the simplest form can be a flat plate that spans the pneumatic cylinder crosswise and projects with its edge over the cylinder wall. It can be frictionally clamped with a clamping device along the edge, for example, in the form of a clamping ring or rings. The clamping force is preferably adjusted such that during a piston-catching operation, which progresses in the manner of a deep-drawing operation, it permits a controlled subsequent sliding of the impact plate edge, so as to avoid the forming of folds in the pot-shaped part that forms and the forming of premature cracks. The clamping ring can be held in position with several screws which are pulled tight with a controlled torque and are secured in the tightened position, for example, with screw-securing shellac or varnish. The clamping ring and a counter surface assigned thereto are advantageously provided with flat contact surfaces for the impact plate. However, the contact surfaces can also be provided with ribs, burls as well as opposite-arranged associated recesses for influencing the sliding through and/or slipping through of the impact plate edge. In addition, it is possible to provide the impact plate with one or several recesses to influence the drawing behavior. In the same way, the impact plate can also be provided with ribs, local reinforcements or local weakened zones. The impact plate preferably has a uniform thickness. However, it is possible to impress a thickness profile designed to distribute the accumulating deformation energy evenly over the complete plate surface or over preferred deformation zones. For this, a rotation-symmetrical plate profile is preferred, meaning variations in the diameter relating to the radial direction, and not variations in the circumferential direction.

The plate can furthermore be graduated or angled up. For example, it can be provided with an angled edge if the associated clamping ring is not flat but is conical.

The piston and the clamping ring are preferably each provided with a rounded area along the respective edge facing the impact plate. This rounded area, preferably having a radius of 5 mm to 20 mm, makes it easier during the deformation to prevent the formation of cracks in the impact plate, and thus prematurely ending the energy absorption.

The impact plate can consist, for example, of a deep-drawable steel sheet but can also be made from a plastic material. In particular, this is true for fiber-reinforced plastic materials, wherein the fibers in the plate are preferably oriented in the radial direction. If non-expandable fibers are used, these must be arranged in a wave shape, for example, to permit the stretching of the plastic body. For example, a mesh of Kevlar, coal fibers, glass fibers or similar material can be worked into the plastic plate. In addition, it is possible to embed stretchable elongatable fibers therein.

Details of advantageous embodiments of the invention are the subject matter of the drawing, the specification or the dependent claims, wherein the drawings illustrate brief description of the drawings exemplary embodiments of the invention.

DETAILED DESCRIPTION OF INVENTION

Figure 1:
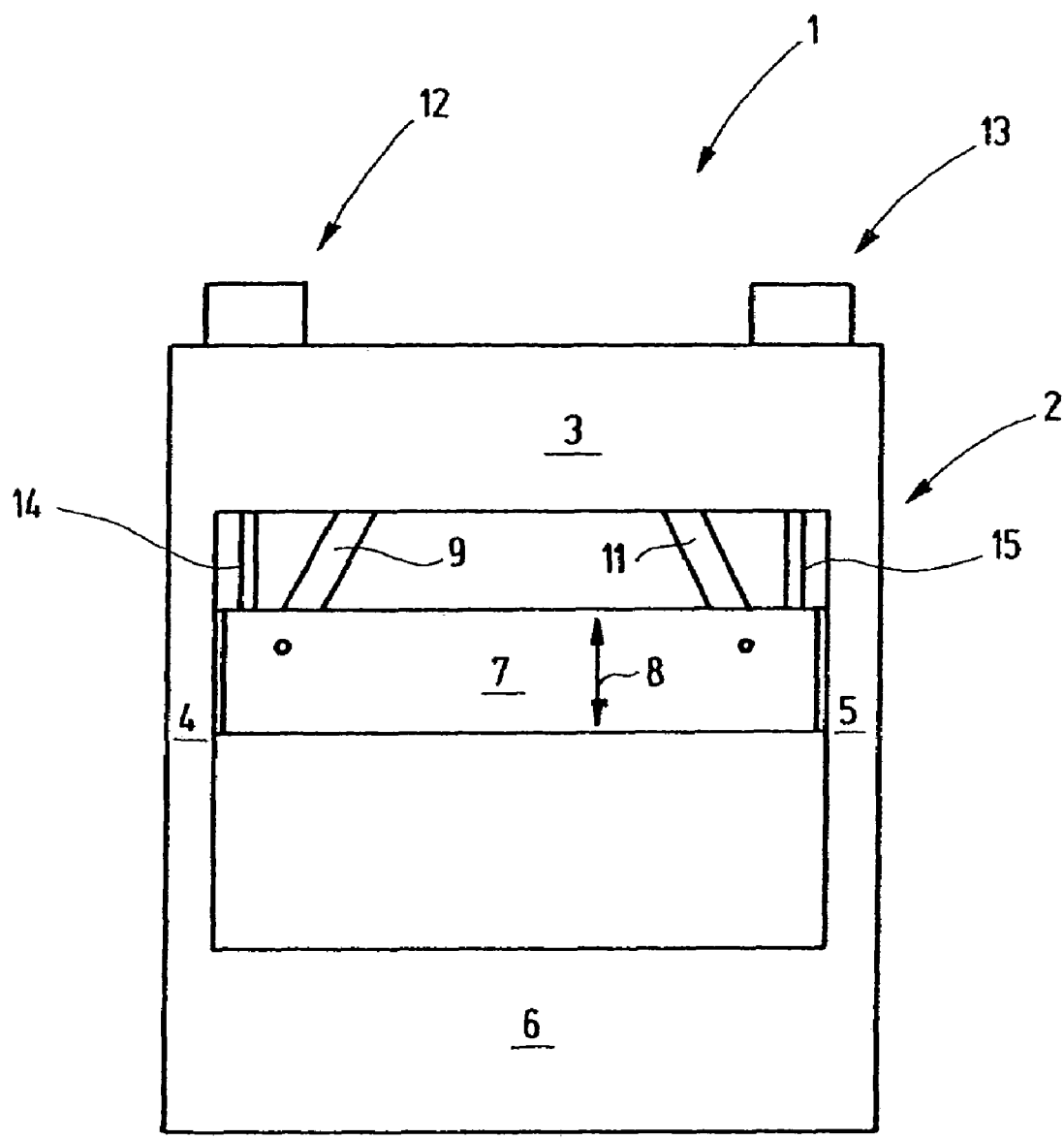
FIG. 1 is a schematic representation of a press with a pneumatic ram weight balancing device.

FIG. 1 contains a schematic view of a press 1, wherein the press 1 comprises a press frame 2 with header 3, supports 4, 5 and press table 6. A ram 7 is positioned above the press table 6, between the supports 4, 5, which ram can move vertically up and down as indicated by arrow 8. The ram 7 is operated by a main press drive that is connected via driving rods 9, 11 to the ram 7. To take a load off the main press drive, one or several weight-balancing devices 12, 13, which generate a pulling force in an upward direction, are assigned to the ram 7. This force is introduced into the ram 7 via piston rods 14, 15 that function as pull rods while the weight-balancing devices 12, 13 support themselves on the press frame 2. Other force-transmitting devices such a pipes or pulling means can also be used in place of the piston rods 14, 15.

Figure 2:
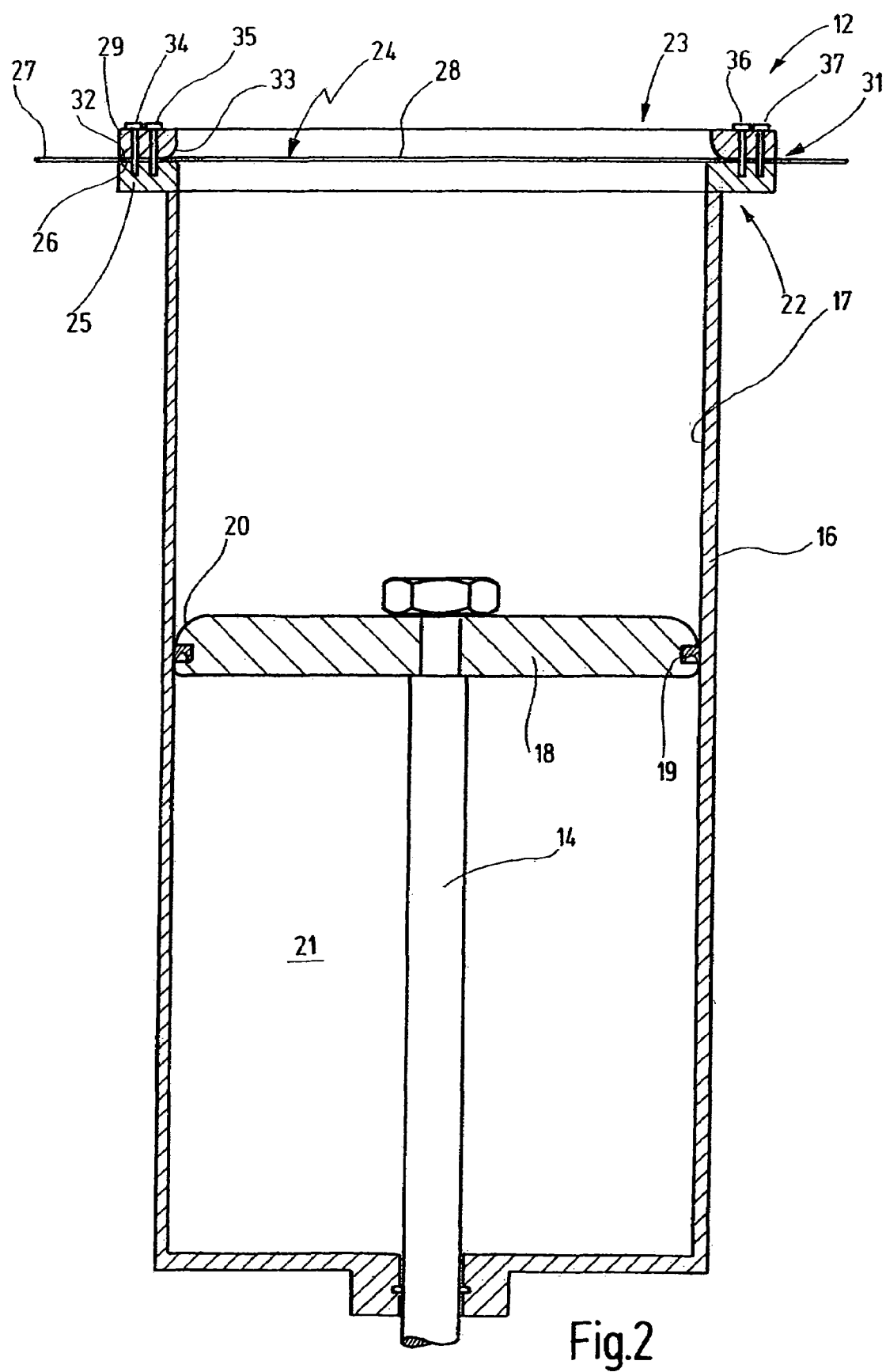
FIG. 2 is a basic representation of a ram weight-balancing device according to the inventions in a longitudinal sectional view, with the piston in the center working position.

The following description of the weight-balancing device 12 applies in the same way to the weight-balancing device 13:

FIG. 2 shows the weight-balancing device 12 in the form of a pneumatic force-generating device. This device comprises a cylinder 16, for example, in the shape of an upright standing tube with a circular cross-section that is provided with a cylindrical wall with an inner surface 17. A plate-shaped piston 18, provided with a seal 19 around its outer circumference, is arranged inside the cylinder 16. This seal 19 seals the piston 18 against the wall surface 17, but still permits a displacement of the piston 18 relative to the longitudinal direction of cylinder 16. The piston 18 is connected in its center to the piston rod 14, which forms a force-transmitting device.

Inside the cylinder 16, the piston 18 divides off a working chamber 21 which contains a gas cushion or bolster, for example, in the form of compressed nitrogen or compressed air. The piston rod 14 extends through the working chamber and out of this cylinder at the lower end of the cylinder 16, such that it is sealed.

At its upper end 22, the cylinder 16 is provided with an impact or catching device 23 which functions to catch the piston 18, and possibly the piston rod 14 connected thereto, if the load carried by the piston rod 14 suddenly drops off. The sudden drop can be due to breakage of the piston rod 14 or breakage of the elements that connect the piston rod 14 to the ram 7. The impact device 23 includes an impact plate 24 that spans the upper end 22 of cylinder 16. A locally held ring or flange 25 with a flat transversely extending contact surface 26 (as shown) on the top is provided at the upper end 22 of the cylinder 16. The ring 25 has a through opening that at least matches the diameter of the inner surface 17 of the cylinder wall or is slightly larger. The catch plate 24 is positioned concentrically to the cylinder 16 and the ring 25 on its contact surface 26. The outer edge region 27 of this plate 24 projects in a radial direction over the support surface 26. As shown, the ring or flange 25 projects laterally beyond the outer wall of the cylinder 16.

The piston 18 is provided on its end facing the impact plate 24, i.e., the top as shown, with an essentially level surface that transitions, at the edge facing the wall surface 17, with a rounded area 20 into the otherwise cylindrical outer circumferential surface of piston 18. The rounded area 20 functions to protect the impact plate 24 during the impact.

The impact plate 24 is preferably a deep-drawable metal plate, for example, a sheet steel plate with a thickness in the range of several millimeters, for example, 3 mm. For the simplest case, the complete plate 24 has a uniform thickness. Alternatively, the thickness, in particular within the diameter determined by the wall surface 17, can have graduations or variations. The center of the impact plate 24 contains an opening 28 that functions, for example, as a ventilation opening, to permit an unhindered movement up and down of the piston 18.

The impact plate 24 is tensioned or clamped with a clamping ring 29 against the contact surface 26. The clamping ring 29 and the ring or flange 25 form a clamping device 31, which serves to allow the edge region 27 of the impact plate 24 to slide radially inwardly in a controlled movement during the deformation. The clamping ring 29 has an internal opening with a diameter that is larger than the outer diameter of the piston 18. The clamping ring 29 is arranged concentrically to the piston 18 as well as the ring 25. On its side facing the ring 25, i.e., the underside as shown, the clamping ring has a flat ring-shaped surface 32 that fits against the impact plate 24. A rounded section 33 is formed at the transition of the surface 32 to the inner opening wall of clamping ring 29. This rounded section 33 has a radius of, for example, 10 mm so that the sheet metal of the impact plate 24 can slide without damage over this edge during the impact.

Figure 9:
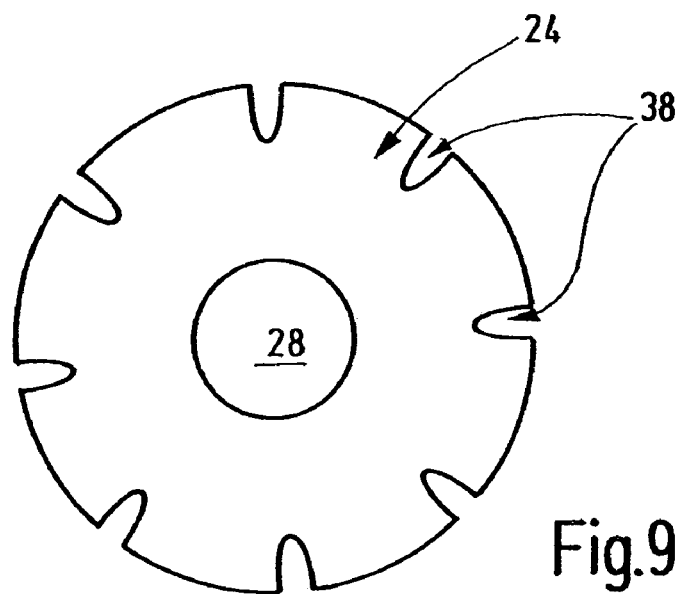
FIG. 9 illustrates a impact plate according to the invention shown in a schematic view from the top.

The clamping ring 29 is tensioned or clamped with tensioning bolts 34, 35, 36, 37 against the ring 25, and is thus also tensioned against the impact plate 24 arranged in-between. The tensioning bolts 34, 35, 36, 37 are seated in corresponding threaded bores in the ring 25 and extend through the impact plate 24 through elongated holes 38, open at the edge, as shown in FIG. 9. The elongated holes 38 can also have a closed outer end edge or can be replaced with different receptacles. The tensioning bolts 34, 35, 36, 37 are distributed with equal angular spacing across the circumference of the clamping ring 29. To generate a desired clamping force, they are tightened with a defined torque that is dimensioned such that during the catching operation, the impact plate 24 can slip through the clamping device 31 without tearing. The tensioning bolts 34, 35, 36, 37 are secured and locked in place with the aid of an adhesive, e.g., a screw securing shellac or other securing means, so that the clamping force generated by the clamping device 31 is maintained. In addition, the clamping ring 29 can support itself on the outside of the ring 25, for example, directly adjacent to the tensioning bolts 34, 35, 36, 37. This type of support leaves a defined gap between the clamping ring 29 and the ring 25, thus making it possible to adjust a defined clamping force.

The above-described device 12 for balancing the ram weight operates as follows:

During an orderly operation of the press 1, the working chamber 21 is provided with pressure. The piston 18 consequently generates an upward-directed force, which is transferred as a pulling force via the piston rod 14 to the ram 7. The force in the upward direction, generated by the piston rod 14, in this case approximately corresponds to the weight share of ram 7 that is assigned to the piston rod 14. The piston 18 moves up and down inside the cylinder 16 along with the up and down movement of the ram 7, wherein the gas volume released or displaced by the piston 18 can be caught by air chambers or expansion chambers that are not shown further herein. In the process, the pressure inside the working chamber 12 remains within predetermined limits.

If a malfunction occurs during operation of the press 1, e.g. the piston rod 14 breaks off (tears off) or parts connecting the piston rod 14 to the ram 7 break off or tear off, the force of the weight of the ram and/or other parts which until then has balanced out or counter balanced the force acting upon the piston 18, suddenly drops off. Such malfunctions occur, if they occur at all, most often near the lower dead center of the piston 18 because the pressure inside the working chamber 21, even if it is essentially constant, is highest at that point. In addition, tilting movements of the ram occur as a result of the forces attacking the ram 7 in this position, which tilting forces can additionally stress the piston rod 14 or the connecting elements.

Figure 3:
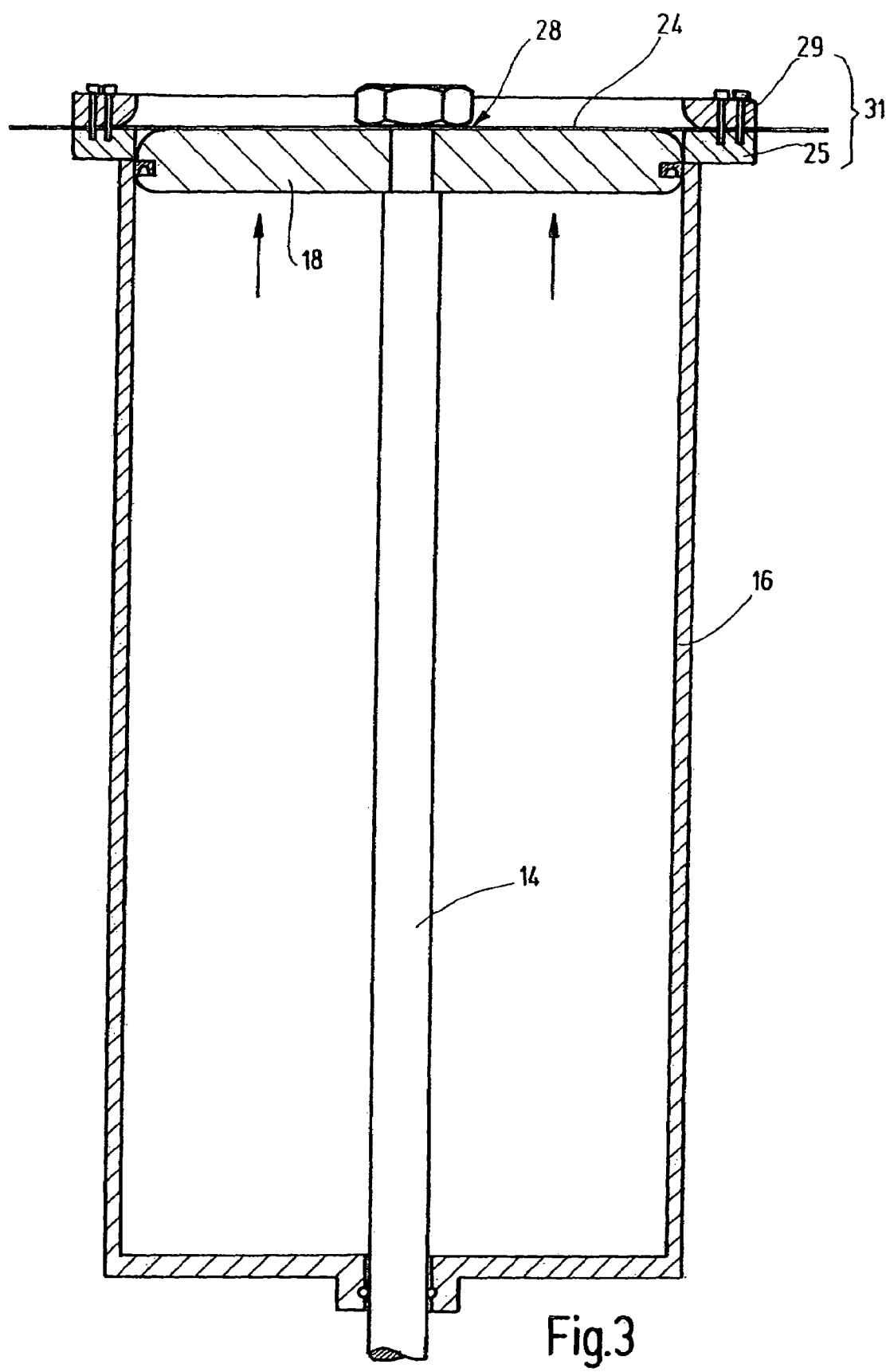
FIG. 3 is a longitudinal sectional view of the ram weight-balancing device according to FIG. 2, with the piston in the position where it impacts with its impact plate.

In the event of such a malfunction, the piston 18 and the remaining part of piston rod 14 connected thereto is accelerated in an upward direction by the total force acting upon the piston 18. This force can actually amount to several tons. The piston 18 in that case moves unhindered in the upward direction until, as illustrated in FIG. 3, the instant where the top surface of the piston 18 impacts the impact plate 24. The impact plate 24 is arranged at a specific desired distance above the usual upper dead point for the piston 18 depending on various known facts, e.g., the weight of the ram, the pressure in the cylinder, the weight of the piston, etc.

Once the piston 18 impacts with the impact plate 24, the fastening nut 40 connecting to the piston 18 to the piston rod 14 projects through the central opening 28 of the plate 24, without this leading to a deformation of the impact plate 24. Above all, though, the opening 28 permits a reduction in the structural height of the air cylinder 16 because the fastening nut 40 can project at the upper dead point through the impact plate 24 and to the outside. The main purpose of the opening 28, however, is to allow the air in the cylinder to flow in or out during the up and down movements of piston 18. The deformation does not occur until the piston 18 moves further in an upward direction than as shown in FIG. 3.

Figure 4:
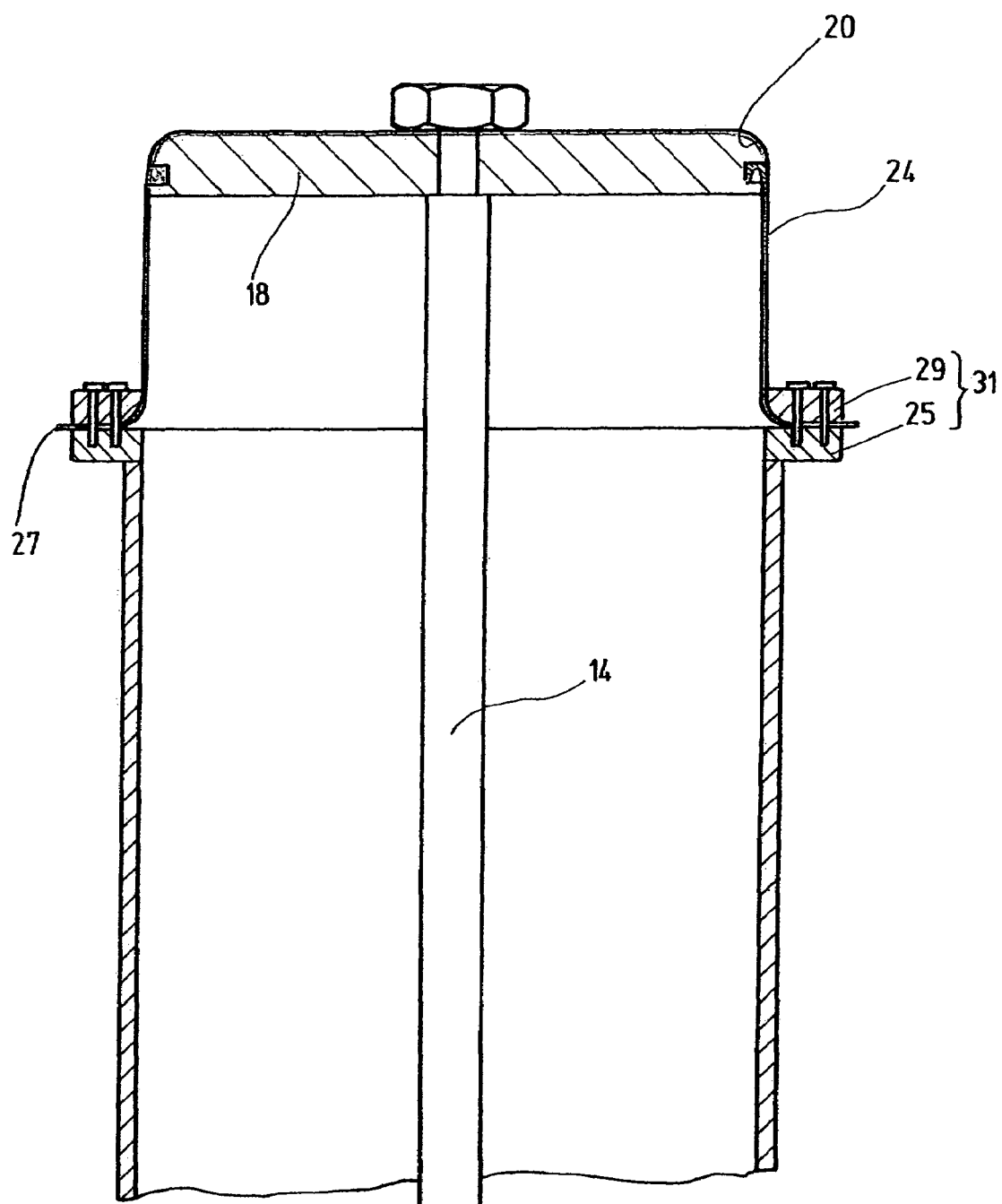
FIG. 4 shows the ram weight-balancing device according to FIGS. 2 and 3 where the piston is caught and stopped, shown in a longitudinal sectional view.

At the instant of the impact between the piston 18 and the impact plate 24, the piston has reached a high speed and thus has also high kinetic energy. Starting with the deformation of impact plate 24, this energy is gradually converted to deformation energy and thus is defused. FIG. 4 illustrates the deformation action at the end when the piston 18 has been stopped. During the deformation, the impact plate 24 is subjected to a deep-drawing operation and, in the process, is deformed into a pot-shaped object with flat (level) bottom and cylindrical walls. The parts of the impact plate 24 that, in the condition shown in FIG. 3, still rest on the level top surface of piston 18 are stretched and at least in part slide over the rounded area 20 of the piston edge. The opening 28 is expanded in the process. The material of the impact plate 24 is stretched in the flat region that rests on the piston 18. In the same way, the material is stretched in the adjacent cylindrical region that is formed between the portion of the piston 18 that moves past the clamping ring 29 and the clamping ring 29. The deformation of impact plate 24 in this region absorbs the main portion of the kinetic energy of piston 18.

The clamping device 31 allows the edge 27 of the impact plate 24 to slide radially inward with a controlled movement to avoid the forming of folds or cracks in the stretched or expanded walls of the pot-shaped object that forms. In the process, the outer circumference of the edge region 27 does not reach the clamping device 31 before the piston 18 is stopped. Preferably, a slight radially projecting length of the plate 24 is planned in as a safety zone, as can be seen in FIG. 4. The friction generated when the edge region 27 is pulled through the clamping device 31 additionally contributes to the conversion of the kinetic energy of piston 18 into non-damaging heat. On the whole, the sum of the friction generated in this case, as well as the other friction and deformation actions, equals the kinetic energy carried along by the piston 18 and the piston rod 14.

The stopping of the piston 18 and the piston rod 14 with the impact plate 24 represents a simple and secure measure for avoiding dangers, such as can occur with a piston rod breakage. The impact device 23 has a simple and reliable design.

Figure 5:
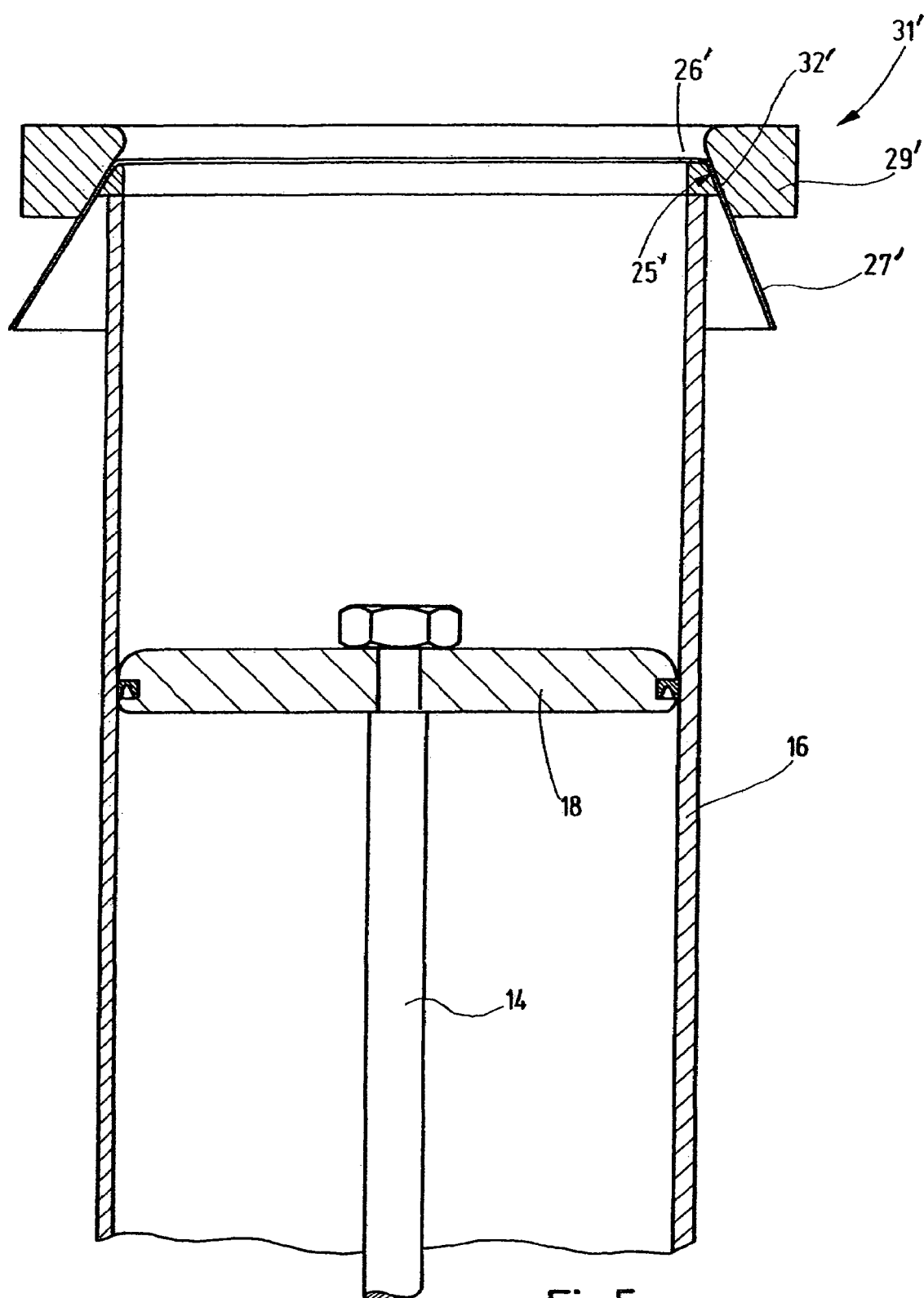
FIG. 5 illustrates a modified embodiment of a ram weight-balancing device according to the invention with the impact plate shown in a longitudinal sectional view.
Figure 6:
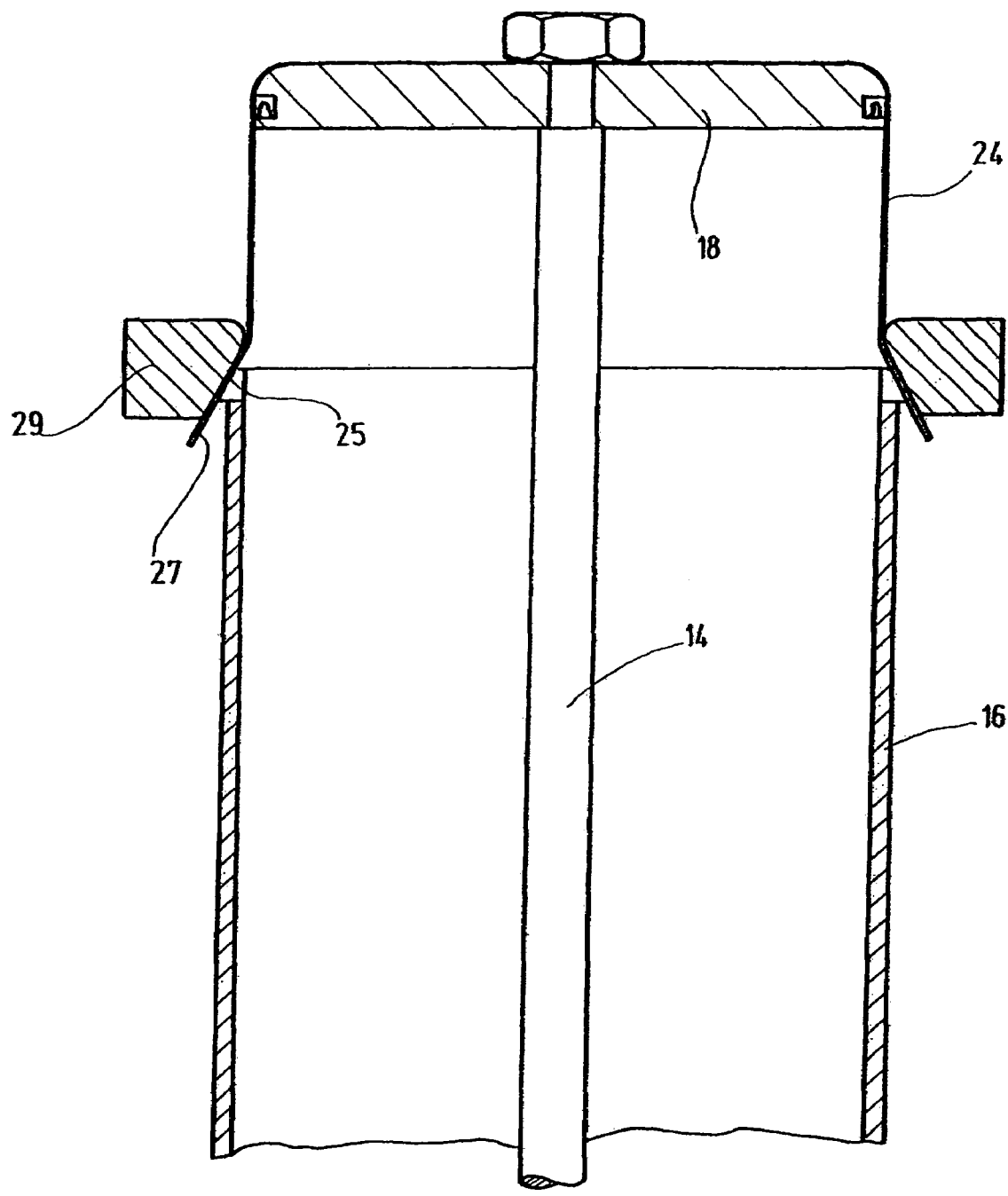
FIG. 6 illustrates the ram weight-balancing device according to FIG. 5, in the position where the piston is caught following a piston-rod breakage, shown schematically in a longitudinal sectional cut.

FIGS. 5 and 6 show a modified embodiment for which the impact plate 24' has an angled edge region 27' in the non-deformed state, for example, a frusto-conical edge as shown. This edge 27' permits the insertion of a ring 25' with conical outer contact surface 26' as a counter-support and a clamping ring 29' with a conical ring surface 32'. The function, however, corresponds for the most part to the function of clamping device 31. FIG. 6 illustrates that a drawing operation occurs during the stopping of the piston 18, during which the impact plate 24' is deformed into a pot-shaped object while the edge 27' follows with a controlled sliding motion while clamped between the ring 25' and the clamping ring 29'.

Figure 7:
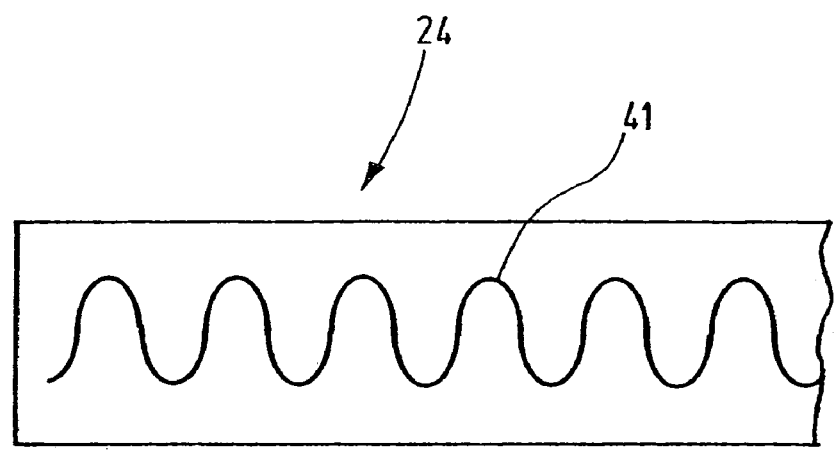
FIG. 7 is a schematic sectional representation of details of an impact plate according to the invention made of plastic, shown just before a deformation.
Figure 8:
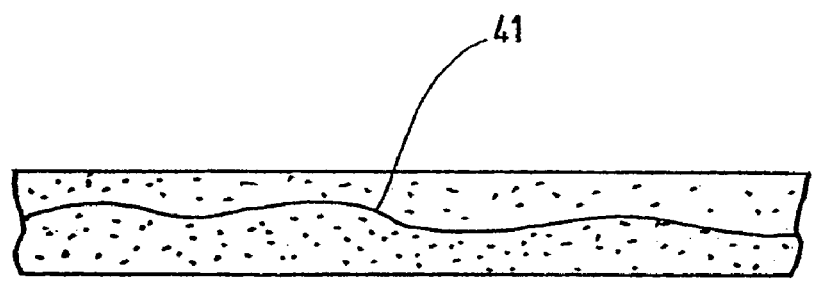
FIG. 8 is a detailed representation of the impact plate according to FIG. 7 in a schematic sectional view following a deformation operation.

A precondition for the above-described exemplary embodiments is that the impact plate 24 or 24' consists of metal, preferably a deep-drawable sheet metal, which is tough and has little tendency to crack. Alternatively, the impact plate 24 can also be a plastic impact plate. FIG. 7, for example, shows an impact plate 24 made of plastic which contains an insert 41 of a fiber material. FIG. 7 shows a sectional view through the impact plate 24 in the radial direction. A non-stretchable material such as coal fiber or glass fiber is provided as an insert material that is arranged in a wave shape to permit a stretching of the impact plate 24 in the radial direction. For example, the insert 41 can take the shape of a mesh where the loop rows are arranged concentrically around the opening 28. In addition, stretchable inserts can also be used, which can be arranged in the stretched form. If an impact plate 24 of this type is stretched, its thickness decreases and the insert 41 is expanded as can be seen in FIG. 8. When using wave-shaped designs, in particular, the wave height of the insert 41 decreases as a result of the stretching. If the insert 41 has become totally straight owing to the stretching operation, then the stretching limit is reached. The dimensioning is such that this limit is not reached, even with the maximum amount of kinetic energy that can be anticipated for piston 18.

In summary an impact device with an impact plate 24 for catching the piston 18 is arranged on a pneumatic force-generating device, for example, the pneumatic cylinder provided as ram weight-balancing device on a press. The deformable impact plate 24 is clamped in tightly along the edge or is held by a clamping device 31, which permits a controlled slipping through. The impact plate 24 is deformed as a result of the impacting piston 18 if the piston is released as a result of damage and is accelerated by the existing gas cushion or bolster and thrown against the impact plate 24.

The invention now being fully described, it will be apparent to one of ordinary skill in the art that many changes and modifications can be made thereto without departing from the spirit or scope of the invention as set forth herein. For example, although the cylinder has been shown in a vertical orientation, other directions of orientation are possible depending on the desired use.

What is claimed is:

1. A pneumatic force-generating device comprising:
   a cylinder that is closed at one end and can be subjected to a gas bolster under pressure;
   a piston that is arranged in the cylinder for displacement along an inner wall surface of the cylinder and is sealed against this wall surface, with the gas bolster acting upon one end of the piston;
   a force-transmitting device connected to the one end of the piston and extending out of one end of the cylinder in a sealed manner, and being connectable to a load; and,
   an impact device for the piston arranged on a second end of the cylinder opposite the one end and provided with a deformable impact plate that covers the second end and deforms and catches the piston when the pressure is present and the force transmitting device is not connected to a load.

2. The device according to claim 1 wherein the force transmitting device is connected to a ram of a press, which constitutes the load, to counter-balance the weight of the ram.

3. The device according to claim 2 wherein the cylinder is vertically oriented.

4. The device according to claim 3 wherein the force transmitting device is a tie-rod for the piston and extends out of a lower end of the cylinder.

5. The device according to claim 1, wherein the impact plate spans the cross section of the cylinder and has a diameter that is larger than an inner diameter of the cylinder.

6. The device according to claim 5, wherein the impact plate is a flat plate.

7. The device according to claim 5, wherein the impact plate is a frusto-conical shaped plate.

8. The device according to claim 1, wherein the impact device further includes a clamping device that engages an outer edge region of the impact plate to frictionally hold the impact plate in place at the another end of the cylinder.

9. The device according to claim 8, wherein the clamping device comprises a clamping ring that clamps the outer edge region of the plate against a counter surface provided on the cylinder.

10. The device according to claim 9 wherein the impact plate is a flat plate and the counter surface extends transverse to a longitudinal axis of the cylinder.

11. The device according to claim 9 wherein the impact plate is a frusto-conical shaped plate and the counter surface has a frusto-conical shape.

12. The device according to claim 8 wherein the outer edge region of the impact plate extends laterally outwardly of the clamping ring and the support surface.

13. The device according to claim 8, wherein the clamping ring is connected to the counter surface and held in a clamping position by a plurality of screws that engage in the counter surface.

14. The device according to claim 13 wherein the plurality of screws are uniformly spaced in the circumferential direction.

15. The device according to claim 8, wherein the frictional connection between the outer edge region of the impact plate and the clamping ring and counter surface permits a controlled slipping of the outer edge region of impact plate in a radial direction upon deformation of the impact plate.

16. The device according to claim 8, wherein the clamping ring is provided with a rounded area along an inner edge that faces the piston and the impact plate.

17. The device according to claim 1, wherein the end of the piston facing the impact plate has a flat surface with a rounded area along an outer circumferential edge.

18. The device according to claim 1, wherein the impact plate contains at least one venting opening.

19. The device according to claim 18 wherein the opening is centrally located in the impact plate.

20. The device according to claim 1 wherein the force transmitting device is a piston rod.

21. The device according to claim 1, wherein the impact plate comprises a deep-drawable steel sheet.

22. The device according to claim 1, wherein the impact plate is made of plastic.

23. The device according to claim 22, wherein the impact plate comprises a fiber-reinforced plastic.

24. The device according to claim 23 wherein the fibers extend in a radial direction in the impact plate.

* * * * *